United States Patent

Röckrath et al.

[11] Patent Number: 5,981,080
[45] Date of Patent: Nov. 9, 1999

[54] MULTI-LAYERED PAINT SPRAYING, PROCESS FOR ACHIEVING SAME, AND A SUITABLE, NON-AQUEOUS FINISHING COAT

[75] Inventors: Ulrike Röckrath, Senden; Hubert Baumgart, Münster-Amelsbüren, both of Germany

[73] Assignee: BASF Coatings AG, Muenster-Hiltrup, Germany

[21] Appl. No.: 09/011,389

[22] PCT Filed: May 26, 1997

[86] PCT No.: PCT/EP97/02677

§ 371 Date: Feb. 24, 1998

§ 102(e) Date: Feb. 24, 1998

[87] PCT Pub. No.: WO97/47700

PCT Pub. Date: Dec. 18, 1997

[30] Foreign Application Priority Data

Jun. 7, 1996 [DE] Germany .................... 196 22 878

[51] Int. Cl.$^6$ ............... B05D 1/36; B32B 27/30; C08L 29/02
[52] U.S. Cl. ............. 428/522; 427/407.1; 427/409; 428/515; 428/520; 428/523; 525/127; 525/162; 525/329.9; 525/440; 525/443
[58] Field of Search ................ 427/407.1, 409; 428/515, 500, 518, 520, 522, 523; 525/127, 162, 329.9, 440, 443

[56] References Cited

U.S. PATENT DOCUMENTS

| | | | |
|---|---|---|---|
| 4,397,989 | 8/1983 | Adesko | 427/409 |
| 4,720,405 | 1/1988 | Carson et al. | 427/407.1 |
| 4,939,213 | 7/1990 | Jacobs, III et al. | 525/329.9 |
| 5,380,816 | 1/1995 | Sullivan | 427/385.5 |
| 5,516,559 | 5/1996 | Rockrath et al. | 427/407.1 |
| 5,593,735 | 1/1997 | Wu et al. | 427/388.3 |
| 5,626,917 | 5/1997 | Brock et al. | 427/410 |
| 5,716,678 | 2/1998 | Rockrath et al. | 427/407.1 |
| 5,741,880 | 4/1998 | Valpey, III et al. | 427/385.5 |
| 5,852,133 | 12/1998 | Gupta et al. | 525/375 |

FOREIGN PATENT DOCUMENTS 0 604 922 A1  12/1992  European Pat. Off. .
WO 95/23653   9/1995  European Pat. Off. .

*Primary Examiner*—Diana Dudash

[57] ABSTRACT

The present invention relates to a process for producing a multicoat paint system, in which (1) an optionally pigmented basecoat is applied to a substrate surface, (2) a polymer film is formed from the basecoat film applied in stage (1), (3) one or more further coating films are applied optionally thereto, (4) then a nonaqueous topcoat is applied which comprises
   A) a hydroxy-functional polyacrylate resin,
   B) as crosslinking agent tris(alkoxycarbonylamino) triazine and
   C) optionally further crosslinking agents, such as blocked isocyanates, which are different from the tris(alkoxycarbonylamino)triazine, and/or amino resins, and subsequently (5) the coating films are baked together, where in that [Sic] the polyacrylate resin comprises secondary OH groups.

14 Claims, No Drawings

5,981,080

MULTI-LAYERED PAINT SPRAYING, PROCESS FOR ACHIEVING SAME, AND A SUITABLE, NON-AQUEOUS FINISHING COAT

FIELD OF THE INVENTION

The present invention relates to a multicoat paint system and to a process for producing it. The invention also relates to nonaqueous coating materials suitable for the multicoat paint system and for the process for producing it.

The invention relates to a process for producing a two-coat paint system, in which (1) a pigmented basecoat is applied to the substrate surface (2) a polymer film is formed from the basecoat applied in stage (1)

(3) a nonaqueous transparent topcoat is applied to the basecoat film thus obtained, and then (4) basecoat film and topcoat film are baked together.

The invention also relates to nonaqueous coating materials suitable for this process.

BACKGROUND OF THE INVENTION

The above-described basecoat/clearcoat process is employed in particular for producing multicoat paint systems, especially metallic finishes on car bodies (cf. e.g. U.S. Pat. No. 3,639,147 and EP-A-38 127).

Using the basecoat/clearcoat process it is possible to produce finishes which, in comparison to one-coat topcoat systems, feature an improved rendering of the effect and feature the possibility of producing paint systems with bright and cleaner shades.

The basecoat applied first in stage (1), depending on the nature, amount and spatial orientation of the pigments employed, determines the shade and, if appropriate, the effect (e.g. metallic or pearlescent effect) of the paint system.

In stage (2) of the process, in an evaporation phase, at least some of the organic solvents and/or of the water is removed from the basecoat film applied in stage (1). Atop this pre-dried but unbaked basecoat film there is applied, in stage (3), a nonaqueous transparent topcoat (wet-on-wet technique) and then, in stage (4), basecoat film and topcoat film are baked together.

The transparent topcoat applied in stage (3) imparts gloss and fullness to the two-coat paint system and protects the pigmented paint film applied in stage (1) against chemical and physical attack.

Using the process under discussion it is possible to obtain high-quality two-coat paint systems only when the transparent topcoat applied in stage (3) does not interfere with the basecoat applied in stages (1) and (2) in such a way that there is impairment of the optical effect (e.g. clouding). On the other hand, the composition of the transparent topcoat must be such that it adheres well to the basecoat film following the baking process conducted in stage (4). Further important properties which the transparent topcoat film obtained after the baking process must have are high transparency, good gloss and good mechanical properties, such as hardness, scratch resistance and elasticity. The transparent topcoat film obtained after the baking process is required not least to have high resistance to climatic effects (e.g. temperature fluctuations, moisture in the form of water vapor, rain, dew, attack by radiation etc.) and to attack by acids or other chemicals, such as organic solvents, for example.

Furthermore, the transparent topcoats applied in stage (3) should have a very low content of organic solvents, and good stability on storage.

JP-A-2-242867 describes a basecoat/clearcoat process in stage (3) of which nonaqueous transparent topcoats are applied which comprise (A) a hydroxyl-containing synthetic resin, (B) an amino resin and (C) a blocked polyisocyanate, where components (B) and (C) are to be selected such that the temperature at which a chemical reaction ensues between (A) and (C) is not more than 20° C. below and not more than 50° C. above the temperature at which a chemical reaction ensues between (A) and (B).

Blocking agents specified for preparing component (C) are: volatile compounds of low molecular mass containing active hydrogen atoms, such as methanol, ethanol, propanol, butanol, hexanol, cyclohexanol, benzyl alcohol, ethylene glycol monoethyl ether and other aliphatic or aromatic monoalcohols, dimethyl- or diethylaminoethanol and other hydroxyl-containing tertiary amines, acetone oxime, methyl ethyl ketone oxime and other oximes, acetylacetone, acetoacetates, malonates and other compounds containing active methylene groups, $\epsilon$-caprolactam and other lactams, and phenol. Blocking agents preferably employed are aliphatic monoalcohols, oximes and caprolactams.

The transparent topcoats described in JP-A-2-242867 give rise to paint systems which, especially in terms of their resistance to organic solvents and acids, gloss, transparency and resistance to yellowing, are to be improved.

DE-B-26 39 491 describes nonaqueous coating materials which comprise a hydroxyl-containing polyester resin and/or alkyd resin, hexamethylene diisocyanate blocked with an alkyl acetoacetate and/or 2,2,4 trimethylhexamethylene [sic] diisocyanate blocked with an alkyl acetoacetate, and an amino resin. These coating materials can also be employed as transparent topcoats in the sector of automotive finishing. The finishes obtained with these coating systems, especially when heightened baking temperatures and/or prolonged baking times are employed, undergo yellowing and are to be improved especially in terms of their resistance to acids and organic solvents and in terms of their scratch resistance.

The properties of the coating materials can be improved by the use of specific crosslinking agents. Mention should be made here in particular of the tris(alkoxycarbonylamino) triazines and derivatives thereof that are known from U.S. Pat. Nos. 5,084,541, 4,939,213, 5,288,865, 4,710,542 and from the EP Applications 0565774, 0541966, 0604922 and EP-B 0245700. Coating materials of this kind feature an especially good chemical resistance, which is evident in particular in the good results of outdoor weathering in Jacksonville, Fla. The tight crosslinking of such formulations, however, has the disadvantage of increased sensitivity toward moisture stresses, which is manifested in blushing of the coating films after such stresses.

SUMMARY OF THE INVENTION

The object of the present invention is now to provide a process for producing a multicoat paint system, in which (1) an optionally pigmented basecoat is applied to a substrate surface, (2) a polymer film is formed from the basecoat film applied in stage (1), (3) one or more further coating films are applied optionally thereto, (4) then a nonaqueous topcoat is applied which comprises
   A) a hydroxy-functional polyacrylate resin, B) as crosslinking agent tris(alkoxycarbonylamino)triazine and C) optionally further crosslinking agents, such as blocked isocyanates, which are different from the tris(alkoxycarbonylamino)triazine, and/or amino resins, and subsequently (5) the coating films are baked together, which leads to coating films which leads [sic] to good results both in the case of outdoor weathering in Jacksonville and in the case of moisture stresses.

This object is achieved by the polyacrylate resin comprising secondary OH groups.

The present invention accordingly provides as well a multicoat paint system comprising (1) one coat of a polymer film of an optionally pigmented basecoat which has been applied to a substrate surface, (2) optionally one or more coating films applied thereto, (3) one coat of a nonaqueous topcoat which comprises A) a hydroxy-functional polyacrylate resin, B) as crosslinking agent tris(alkoxycarbonylamino)triazine and C) optionally further crosslinking agents, such as blocked isocyanates, which are different from the tris(alkoxycarbonylamino)triazine, and/or amino resins, and subsequently (4) the coating films are baked together, characterized in that the polyacrylate resin comprises secondary OH groups.

A further subject of the invention is a nonaqueous coating material comprising

A) a hydroxy-functional polyacrylate resin,

B) as crosslinking agent tris(alkoxycarbonylamino)triazine and

C) optionally further crosslinking agents, such as blocked isocyanates, which are different from the tris (alkoxycarbonylamino)triazine, and/or amino resins, characterized in that the polyacrylate resin (A) comprises secondary OH groups.

The invention also relates, finally, to the use of the specified nonaqueous coating material for producing transparent topcoats and to the use of the multicoat paint system for coating car bodies.

The multicoat paint systems produced by the process of the invention feature high hardness, high gloss, good adhesion between basecoat film and topcoat film, good topcoat holdout, good scratch resistance and good resistance to climatic effects, organic solvents and acids, and also high resistance to yellowing (especially to yellowing which occurs as a consequence of high baking temperatures and/or as a consequence of long baking times). These good properties are obtained even when different basecoats are used. The transparent topcoats employed in accordance with the invention are also notable for high stability on storage and can also be processed readily with a low content (e.g. less than 50% by weight) of organic solvents. In particular, the coating materials of the invention feature good resistance to the specific weathering effects in Jacksonville exposure and low sensitivity toward moisture stress. Consequently, the otherwise observed blushing of the coating films is not noted in the case of the present invention.

DETAILED DESCRIPTION OF THE PREFERRED EMBODIMENTS

In stage (1) of the process of the invention it is possible in principle to employ all pigmented basecoats which are suitable for producing two-coat paint systems. Such basecoats are well known to the skilled worker. It is possible to employ both water-dilutable basecoats and basecoats based on organic solvents. Suitable basecoats are described, for example, in U.S. Pat. No. 3,639,147, DE-A-33 33 072, DE-A-38 14 853, GB-A-2 012 191, U.S. Pat. No. 3,953,644, EP-A-260 447, DE-A-39 03 804, EP-A-320 552, DE-A-36 28 124, U.S. Pat. No. 4,719,132, EP-A-297 576, EP-A-69 936, EP-A-89 497, EP-A-195 931, EP-A-228 003 and DE-A-28 18 100. These patent documents are also a source of further information on the basecoat/clearcoat technique under discussion.

In stage (2) of the process of the invention, in an evaporation phase, the solvents and/or the water are removed from the basecoat applied in stage (1). The basecoat film can also be baked. This is, however, disadvantageous on economic grounds since then two or more baking operations are required to produce the multicoat paint system instead of one baking operation.

In stage (3) of the process of the invention it is preferred to employ transparent nonaqueous coating materials.

Hydroxyl-containing polyacrylate resins are well known. Examples of such resins and their preparation are described, for example, in JP-A-2-24 28 67, DE-B-26 39 491 and in the patent documents specified on page 6 in lines 31 to 36.

In the process of the invention it is preferred as component (A) to employ polyacrylate resins which have hydroxyl numbers of from 40 to 240, preferably from 60 to 210 and, with very particular preference, from 100 to 200, acid numbers of from 0 to 35, preferably from 0 to 23 and, with very particular preference, from 3.9 to 15.5, glass transition temperatures of from −35 to +70° C., preferably from −20 to +40° C. and, with very particular preference, from −20 to +15° C. and number-average molecular weights of from 1500 to 30,000, preferably from 2000 to 15,000 and, with very particular preference, from 2500 to 5000.

As component (A) it is particularly preferred to employ polyacrylate resins which can be prepared by reacting (a) from 10 to 92, preferably from 20 to 70% by weight of an alkyl or cycloalkyl acrylate or of an alkyl or cycloalkyl methacrylate having 1 to 18, preferably 4 to 13 carbon atoms in the alkyl or cycloalkyl radical, or mixtures of such monomers (b) from 8 to 60, preferably from 12.5 to 51% by weight of a hydroxyalkyl acrylate or of a hydroxylalkyl [sic] methacrylate having 2 to 4 carbon atoms in the hydroxyalkyl radical, or mixtures of such monomers, where the overall amount of the hydroxy-functional acrylates or methacrylates is combined from 10 to 90% by weight, preferably from 20 to 80 [lacuna] hydroxy-functional acrylates or methacrylates having primary OH groups and from 90 to 10% by weight, preferably from 20 to 80% by weight, of hydroxy-functional acrylates or methacrylates having secondary OH groups, (c) from 0.0 to 5.0, preferably from 0.0 to 3.0% by weight of acrylic acid or methacrylic acid, or mixtures of these monomers, and (d) from 0 to 50, preferably from 0 to 40% by weight of ethylenically unsaturated monomers which are different from but copolymerizable with (a), (b) and (c), or mixtures of such monomers.

Very particular preference is given to polyacrylate resins which can be prepared by reacting (a) from 20 to 60 of an alkyl or cycloalkyl acrylate or of an alkyl or cycloalkyl methacrylate having 1 to 18, preferably 4 to 13 carbon atoms in the alkyl or cycloalkyl radical, or mixtures of such monomers (b) from 20 to 41% by weight of a hydroxyalkyl acrylate or of a hydroxylalkyl methacrylate having 2 to 4 carbon atoms in the hydroxyalkyl radical, or mixtures of such monomers, where the overall amount of the hydroxy-functional acrylates or methacrylates is combined from 25 to 50% by weight of hydroxy-functional acrylates or methacrylates having primary OH groups and from 75 to 50% by weight of hydroxy-functional acrylates or methacrylates having secondary OH groups, (c) from 0.5 to 2% by weight of acrylic acid or methacrylic acid, or mixtures of these monomers, and (d) from 0 to 30% by weight of ethylenically unsaturated monomers which are different from but copolymerizable with (a), (b) and (c), or mixtures of such monomers.

Examples of (a) components are:

methyl, ethyl, propyl, n-butyl, isobutyl, tert-butyl, pentyl, hexyl, heptyl and 2-ethylhexyl acrylate and methacrylate and also cyclohexyl acrylate and cyclohexyl methacrylate.

Examples of (b) components having primary OH groups are:

2-hydroxyethyl acrylate, 2-hydroxyethyl methacrylate, 4-hydroxybutyl acrylate, 4-hydroxybutyl methacrylate and the adducts thereof with E-caprolactone;

Examples of (b) components having secondary OH groups are:

2-hydroxypropyl acrylate, 2-hydroxypropyl methacrylate and the adducts of acrylic acid and methacrylic acid with the glycidyl ester of Versatic acid.

Examples of (d) components are:

vinylaromatic compounds, such as, for example, styrene, vinyltoluene, α-methylstyrene, α-ethylstyrene, ring-substituted di-ethylstyrenes, isopropylstyrene, butyl-styrenes and methoxystyrenes; vinyl ethers, such as, for example, ethyl vinyl ether, n-propyl vinyl ether, isopropyl vinyl ether, n-butyl vinyl ether and isobutyl vinyl ether, and vinyl esters, such as, for example, vinyl acetate, vinyl propionate, vinyl butyrate, vinyl pivalate and the vinyl ester of 2-methyl-2-ethylheptanoic acid.

The hydroxyl number and the acid number of the polyacrylate resins can be controlled by the skilled worker without problems by way of the amount of component (b) and (c), respectively, that is employed.

The glass transition temperature of the polyacrylate resin is determined by the nature and amount of the monomers employed. The monomers can be selected by the skilled worker with the aid of the following formula, by means of which it is possible to calculate approximately the glass transition temperature of polyacrylate resins:

$$\frac{1}{T_G} = \sum_{n=1}^{n=x} \frac{W_n}{T_{Gn}}$$

$T_G$=glass transition temperature of the polyacrylate resin
x=number of different monomers copolymerized in the polyacrylate resin.
$W_n$=proportion by weight of the nth monomer
$T_{Gn}$=glass transition temperature of the homopolymer of the nth monomer.

Measures for controlling the molecular weight (e.g. selection of appropriate polymerization initiators, use of chain transfer agents, etc.) belong to the expert knowledge of the averagely skilled worker and need not be elucidated further here.

As component (A) it is also possible to employ mixtures of the described polyacrylate resins with other synthetic resins. Examples are polyester resins or alkyd resins which can be prepared by reacting (α) a cycloaliphatic or aliphatic polycarboxylic acid or a mixture of such polycarboxylic acids (β) an aliphatic or cycloaliphatic polyol having more than two hydroxyl groups in the molecule, or a mixture of such polyols (γ) an aliphatic or cycloaliphatic diol or a mixture of such diols and (δ) an aliphatic linear or branched saturated monocarboxylic acid or a mixture of such monocarboxylic acids in a molar ratio of (α):(β):(γ):(δ)=1.0:0.2-1.3:0.0-1.1:0.0-1.4, preferably 1.0:0.5-1.2:0.0-0.6:0.2-0.9 to form a polyester resin or alkyd resin.

Examples of component (α) are: hexahydrophthalic acid, 1,4-cyclohexanedicarboxylic acid, endomethylenetetrahydrophthalic acid, oxalic acid, malonic acid, succinic acid, glutaric acid, adipic acid, pimelic acid, suberic acid, azelaic acid and sebacic acid.

Examples of component (β) are: pentaerythritol, trimethylolpropane, trimethylolethane and glycerol.

Examples of component (γ) are: ethylene glycol, diethylene glycol, propylene glycol, neopentyl glycol, 2-methyl-2-propylpropanediol-1,3,2-ethyl-2-butylpropane-1,3-diol, 2,2,4-trimethylpentane-1,5-diol, 2,2,5-trimethylhexane-1,6-diol, neopentyl glycol hydroxypivalate and dimethylolcyclohexane.

Examples of component (δ) are: 2-ethylhexanoic acid, lauric acid, isooctanoic acid, isononanoic acid and monocarboxylic acid mixtures which are obtained from coconut oil or palm kernel oil.

The preparation of hydroxyl-bearing polyester resins and/or alkyd resins is described, for example, in Ullmanns Encyklopädie der technischen Chemie, third edition, 14th volume, Urban & Schwarzenberg, Munich, Berlin 1863, pages 80 to 89 and pages 99 to 105, and in the books: Résines Alkydes-Polyesters by J. Bourry, Paris, Dunod publishers 1952, Alkyd Resins by C. R. Martens, Reinhold Publishing Corporation, New York 1961 and Alkyd Resin Technology by T. C. Patton, Interscience Publishers 1962.

As component (B) use is made of tris (alkoxycarbonylamino)triazines in accordance with U.S. Pat. No. 4,939,213, U.S. Pat. No. 5,084,541 and EP 0 624 577. Derivatives of these compounds can also be employed.

The tris(alkoxycarbonylamino)triazines and derivatives thereof can, in accordance with the invention, also be employed in a mixture with conventional crosslinking agents (component C). Blocked polyisocyanates different from the tris(alkoxycarbonylamino)triazines are particularly suitable here. It is also possible to employ amino resins, for example melamines.

In principle it is possible to employ any amino resin which is suitable for transparent topcoats, or a mixture of such amino resins.

Resins of this kind are well known to the skilled worker and are marketed by many companies as sales products. Amino resins are condensation products of aldehydes, especially formaldehyde, with, for example, ureas, melamine, guanamine and benzoguanamine. The amino resins include alcohol groups, preferably methylol groups, all or some of which have generally been etherified with alcohols.

As component (C) it is preferred to employ melamine-formaldehyde resins which have been etherified with lower alcohols, especially with methanol or butanol. Particular preference is given to the use as component (B) of melamine-formaldehyde resins which have been etherified with lower alcohols, especially with methanol and/or butanol, and which on statistical average per triazine ring still comprise from 0.1 to 0.25 hydrogen atoms attached to nitrogen atoms.

The topcoats employed in accordance with the invention may also comprise as component (C) a blocked polyisocyanate or a mixture of blocked polyisocyanates.

In principle, all polyisocyanates which can be employed in the paints sector can be employed to prepare component (C). It is preferred, however, to employ polyisocyanates whose isocyanate groups are attached to aliphatic or cycloaliphatic radicals. Examples of such polyisocyanates are hexamethylene diisocyanate, isophorone diisocyanate, trimethylhexamethylene diisocyanate, dicyclohexylmethane diisocyanate and 1,3-bis(2-isocyanatoprop-2-yl)benzene (TMXDI) and also adducts of these polyisocyanates with polyols, especially low molecular mass polyols, such as trimethylolpropane, for example, and polyisocyanates which are derived from these polyisocyanates and contain isocyanurate groups and/or biuret groups. It is particularly preferred as polyisocyanates to employ hexamethylene diisocyanate and isophorone diisocyanate, polyisocyanates derived from these diisocyanates containing isocyanurate or biuret groups and preferably including more than two isocyanate groups in the molecule, and also reaction products of hexamethylene diisocyanate and isophorone diisocyanate, or of a mixture of hexamethylene diisocyanate and isophorone diisocyanate, with 0.3–0.5 equivalents of a low molecular mass polyol having a molecular weight of from 62 to 500, preferably from 104 to 204, especially a triol, such as trimethylolpropane, for example.

As blocking agents it is possible to employ dialkyl malonates or a mixture of dialkyl malonates.

Examples of dialkyl malonates that can be employed are dialkylmalonates having from 1 to 6 carbon atoms in each of the alkyl radicals, such as dimethyl malonate and diethyl malonate, for example, preference being given to the employment of diethyl malonate.

It is possible, furthermore, to employ other blocking agents containing active methylene groups, and oximes, and also mixtures of these blocking agents. Examples are: methyl, ethyl, propyl, butyl, pentyl, hexyl, heptyl, octyl, nonyl, decyl or dodecyl acetoacetate, acetone oxime, methyl ethyl ketoxime, acetylacetone, formal doxime, acetaldoxime, benzophenoxime, acetoxime and diisobutyl ketoxime.

The components (A), (B) and (C) are generally employed, in the transparent topcoats that are employed in accordance with the invention, in amounts such that component (A) is present in an amount of from 20 to 80, preferably from 30 to 60% by weight, component (B) in an amount of from 1 to 50, preferably from 5 to 35% by weight and component (C) in an amount of from 0 to 50, preferably from 0 to 35% by weight, the percentages by weight for (A)+(B)+(C) being=100% by weight and being based on the solids content of the component (A), (B) and (C).

The transparent topcoats employed in accordance with the invention preferably comprise no pigments or only transparent pigments. As organic solvents, the topcoats comprise customary organic solvents which are conventional for the preparation of coating materials. The topcoats may, in addition, include further conventional additives, such as light stabilizers, leveling assistants, etc.

The multicoat paint systems produced using the topcoats that are employed in accordance with the invention feature the advantageous properties especially when they have been baked under the baking conditions currently employed in the production-line (OEM) finishing of cars (30 minutes at 130° C. or 20 minutes at 140° C.).

The invention is elucidated further in the examples which follow. All amounts and percentages, unless expressly stated otherwise, are to be understood as figures by weight.

Acrylate Resin A (According to the Invention)

Into a laboratory reactor having a useful volume of 4 l and fitted with two dropping funnels for the monomer mixture and initiator solution, respectively, a nitrogen inlet pipe, thermometer and reflux condenser there are weighed 731 g of a fraction of aromatic hydrocarbons having a boiling range of 158 to 172° C. The solvent is heated to 140° C. On reaching 140° C., a monomer mixture comprising 458 g of ethylhexyl methacrylate, 183 g of n-butyl methacrylate, 214 g of styrene, 183 of 2-hydroxyethyl acrylate, 458 g of 2-hydroxypropyl methacrylate and 31 g of acrylic acid is metered into the reactor at a uniform rate over the course of 4 hours, and an initiator solution of 153 g of t-butyl perethylhexanoate in 92 g of the described aromatic solvent is metered into the reactor at a uniform rate over the course of 4.5 hours. The metered addition of the monomer mixture and of the initiator solution is begun simultaneously. After the end of the metered addition of the initiator, the reaction mixture is held at 140° C. for two hours more and then cooled. The resulting polymer solution has a solids content of 65% (determined in a convection oven at 130° C. for 1 h), an acid number of 17 and a viscosity of 24.5 dPas (measured on a 60% strength dilution of the polymer solution in the described aromatic solvent, using an ICI plate-cone viscometer at 23° C.).

Acrylate Resin B (Comparative Example)

Into a laboratory reactor having a useful volume of 4 l and fitted with two dropping funnels for the monomer mixture and initiator solution, respectively, a nitrogen inlet pipe, thermometer and reflux condenser there are weighed 731 g of a fraction of aromatic hydrocarbons having a boiling range of 158 to 172° C. The solvent is heated to 140° C. On reaching 140° C., a monomer mixture comprising 763 g of ethylhexyl methacrylate, 122 g of n-butyl methacrylate, 214 g of styrene, 397 g of 4-hydroxybutyl acrylate and 31 g of acrylic acid is metered into the reactor at a uniform rate over the course of 4 hours, and an initiator solution of 153 g of t-butyl perethylhexanoate in 92 g of the described aromatic solvent is metered into the reactor at a uniform rate over the course of 4.5 hours. The metered addition of the monomer mixture and of the initiator solution is begun simultaneously. After the end of the metered addition of the initiator, the reaction mixture is held at 140° C. for two hours more and then cooled. The resulting polymer solution has a solids content of 65% (determined in a convection oven at 130° C. for 1 h), an acid number of 17 and a viscosity of 3.8 dPas (measured on a 60% strength dilution of the polymer solution in the described aromatic solvent, using an ICI plate-cone viscometer at 23° C.).

Acrylate Resin C (Comparative Example)

Into a laboratory reactor having a useful volume of 4 l and fitted with two dropping funnels for the monomer mixture and initiator solution, respectively, a nitrogen inlet pipe, thermometer and reflux condenser there are weighed 731 g of a fraction of aromatic hydrocarbons having a boiling range of 158 to 172° C. The solvent is heated to 140° C. On reaching 140° C., a monomer mixture comprising 546 g of ethylhexyl methacrylate, 183 g of n-butyl methacrylate, 214 g of styrene, 552 g of 2-hydroxyethyl acrylate and 31 g of acrylic acid is metered into the reactor at a uniform rate over the course of 4 hours, and an initiator solution of 153 g of t-butyl perethylhexanoate in 92 g of the described aromatic solvent is metered into the reactor at a uniform rate over the course of 4.5 hours. The metered addition of the monomer mixture and of the initiator solution is begun simultaneously. After the end of the metered addition of the initiator, the reaction mixture is held at 140° C. for two hours more and then cooled. The resulting polymer solution has a solids content of 65% (determined in a convection oven at 130° C. for 1 h), an acid number of 19 and a viscosity of 19 dPas (measured on a 60% strength dilution of the polymer solution in the described aromatic solvent, using an ICI plate-cone viscometer at 23° C.).

TABLE 1

|  | Acrylate resin A | Acrylate resin B | Acrylate resin C |
|---|---|---|---|
| EHMA[1] | 458 | 763 | 546 |
| nBMA[2] | 183 | 122 | 183 |
| Styrene | 214 | 214 | 214 |
| 2-HEA[3] | 183 | — | 552 |
| 4-HBA[4] | — | 397 | — |
| HPMA[5] | 458 | — | — |
| AA[6] | 31 | 31 | 31 |
| TBPEH[7] | 153 | 153 | 153 |

[1] 2-ethylhexyl methacrylate
[2] n-butyl methacrylate
[3] 2-hydroxyethyl acrylate
[4] 4-hydroxybutyl acrylate
[5] 2-hydroxypropyl methacrylate
[6] acrylic acid
[7] tert-butyl perethylhexanoate Preparing the Clearcoats The clearcoats are prepared by weighing out the polyacrylate resin solutions, then adding the amounts indicated in Tab. 2 of triazine crosslinker, solvent, UV adsorber, free-radical scavenger and leveling agent, with stirring, and carrying out thorough incorporation by stirring. The resulting coating materials are if appropriate adjusted, for application, to a viscosity of 23 sec (measured with a DIN 4 cup at 20° C.) using xylene.

TABLE 2

|  | Clearcoat A | Clearcoat B | Clearcoat C |
|---|---|---|---|
| Acrylate resin A | 55.0 | — | — |
| Acrylate resin B | — | 62.4 | — |
| Acrylate resin C | — | — | 55.0 |
| Triazine crosslinker[1] | 28.2 | 18.5 | 28.2 |
| UV absorber[2] | 0.8 | 0.9 | 0.8 |
| Free-radical scavenger[3] | 1.0 | 1.1 | 1.0 |
| Leveling agent[4] | 1.5 | 1.7 | 1.5 |
| Petroleum spirit 180/210 | 6.0 | 6.8 | 6.0 |
| Xylene | 2.5 | 2.8 | 2.5 |
| Solvesso 150 | 7.1 | 6.0 | 6.0 |
| Blushing[5] | no | no | yes |
| Jacksonville rating[6] | 3.5 | 10 | 4 |

[1] triazine crosslinker as per US 4939312, US 5054541 (Cytec)
[2] commercial UV absorbers of the benzotriazol class
[3] commercial free-radical scavenger based on a sterically hindered amine
[4] commercial leveling agent based on a polydimethylsiloxane
[5] blushing after moisture stress (240 h/40° C., 100% rel. atmospheric humidity)
[6] metal panel exposure in Jacksonville, Florida; rating 1 (good)–10 (poor)

We claim:

1. A process for producing a multicoat paint system, comprising
   (1) applying a basecoat to a substrate surface,
   (2) forming a polymer film from the basecoat applied in stage (1),
   (3) applying to the polymer film a nonaqueous topcoat comprising
      A) a hydroxy-functional polyacrylate resin comprising secondary OH groups,
      B) as crosslinking agent tris(alkoxycarbonyl-amino)triazine and
      C) optionally further crosslinking agents,
   and
   (4) baking together the nonaqueous topcoat applied to the polymer film.

2. A multicoat paint system comprising
   (1) a polymer film of a basecoat applied to a substrate surface, and
   (2) a nonaqueous topcoat applied to the polymer film, the nonaqueous topcoat comprising
      A) a hydroxy-functional polyacrylate resin comprising secondary OH groups,
      B) a crosslinking agent comprising tris(alkoxycarbonylamino)triazine and
      C) optionally further crosslinking agents.

3. A non aqueous coating material comprising
   A) a hydroxy-functional polyacrylate resin comprising secondary OH groups,
   B) a crosslinking agent comprising tris(alkoxycarbonylamino)triazine and
   C) optionally further crosslinking agents.

4. The nonaqueous coating material of claim 3, which is transparent.

5. The nonaqueous coating material of claim 3, comprising the polyacrylate resin having a hydroxyl number of from 40 to 200, an acid number of from 0 to 35, a glass transition temperature of from −35 to +70° C., and a number-average molecular weight of from 1500 to 30,000.

6. The nonaqueous coating material of claim 5, comprising the polyacrylate resin having a hydroxyl number of from 60 to 210, an acid number of from 0 to 23, a glass transition temperature of from −20 to +40° C. and a number average molecular weight of from 2000 to 15,000.

7. The nonaqueous coating material of claim 3, comprising
   A) a hydroxy-functional polyacrylate resin comprising
      (a) from 10 to 92% by weight of a monomer selected from the group consisting of an alkyl or cycloalkyl acrylate having 1 to 18, carbon atoms in the alkyl or cycloalkyl radical, an alkyl or cycloalkyl methacrylate having 1 to 18 carbon atoms in the alkyl or cycloalkyl radical, and mixtures of such monomers,
      (b) from 8 to 60% by weight of a mixture of hydroxy-functional acrylates or hydroxy-functional methacrylates having 2 to 4 carbon atoms in the hydroxyalkyl radical, wherein the mixture comprises from 10 to 90% by weight of hydroxy-functional acrylates or hydroxy-functional methacrylates having primary OH groups and from 90 to 10% by weight of hydroxy-functional acrylates or hydroxy-functional methacrylates having secondary OH groups,
      (c) from 0 to 5% by weight of acrylic acid or methacrylic acid, or mixtures of these monomers, and
      (d) from 0 to 50% by weight of ethylenically unsaturated monomers which are different from but copolymerizable with (a), (b) and (c), or mixtures of such monomers.

8. The nonaqueous coating material of claim 7, comprising
   A) a hydroxy-functional polyacrylate resin comprising
      (a) from 20 to 60% by weight of a monomer selected from the group consisting of an alkyl or cycloalkyl acrylate having 4 to 13 carbon atoms in the alkyl or cycloalkyl radical, an alkyl or cycloalkyl methacrylate having 4 to 13 carbon atoms in the alkyl or cycloalkyl radical, and mixtures of such monomers,
- (b) from 20 to 41% by weight of a mixture of hydroxy-functional acrylates or hydroxy-functional methacrylates having 2 to 4 carbon atoms in the hydroxyalkyl radical, wherein the mixture comprises from 25 to 50% by weight of hydroxy-functional acrylates or hydroxy-functional methacrylates having primary OH groups and from 75 to 50% by weight of hydroxy-functional acrylates or hydroxy-functional methacrylates having secondary OH groups,
- (c) from 0.5 to 2% by weight of acrylic acid or methacrylic acid, or mixtures of these monomers, and
- (d) from 0 to 30% by weight of ethylenically unsaturated monomers which are different from but copolymerizable with (a), (b) and (c), or mixtures of such monomers.

9. The process of claim 1 wherein the basecoat is pigmented.

10. The process of claim 1 wherein one or more further coatings are applied to the polymer film formed from the basecoat.

11. The process of claim 1 wherein the substrate is a car body.

12. The nonaqueous coating material of claim 3 comprising

C) further crosslinking agents selected from the group consisting of blocked isocyanates which are different from the tris(alkoxycarbonylamino)triazine, an amino resin, and mixtures thereof.

13. A process for producing a multicoat paint system, comprising
- (1) applying a basecoat to a substrate surface,
- (2) forming a polymer film from the basecoat applied in stage (1),
- (3) applying to the polymer film a one-component nonaqueous topcoat comprising
    A) a hydroxy-functional polyacrylate resin comprising secondary OH groups,
    B) as crosslinking agent tris(alkoxycarbonyl-amino) triazine and
    C) optionally further crosslinking agents,
and
- (4) baking together the one-component nonaqueous topcoat applied to the polymer film.

14. A one-component nonaqueous coating composition comprising
    A) a hydroxy-functional polyacrylate resin comprising secondary OH groups,
    B) a crosslinking agent comprising tris (alkoxycarbonylamino)-triazine and
    C) optionally further crosslinking agents.

* * * * *